United States Patent

[11] 3,633,672

[72] Inventors Charles F. Smith
Tulsa;
Thomas J. Nolan, III, Langston, both of Okla.
[21] Appl. No. 36,463
[22] Filed May 11, 1970
[45] Patented Jan. 11, 1972
[73] Assignee The Dow Chemical Company
Midland, Mich.

[54] INHIBITION OF DEPOSITION OF SCALE
7 Claims, No Drawings

[52] U.S. Cl. .................................................. 166/279,
166/307, 252/8.55 B
[51] Int. Cl. ...................................................... C02b 5/06,
C09k 3/00, E21b 43/27
[50] Field of Search ........................................... 166/310,
279, 305, 306, 307; 210/58; 252/8.55 C, 8.55 B, 8.55 E

[56] References Cited
UNITED STATES PATENTS
3,130,153  4/1964  Keller, Jr. ...................... 166/310 X
3,288,217  11/1966  Ralston ........................ 166/310 X
3,336,221  8/1967  Ralston ........................ 252/8.55 B
3,393,150  7/1968  Ralston ........................ 210/58
3,429,824  2/1969  Tate ............................ 252/8.55 B
3,467,192  9/1969  Nolan III et al. ............. 166/279
3,481,869  12/1969  Jones .......................... 252/8.55 B
3,483,925  12/1969  Slyker ......................... 166/310 X
3,487,018  12/1969  Troscinski ................... 210/58
3,547,817  12/1970  Hansen, Jr. et al. .......... 210/58

*Primary Examiner*—Stephen J. Novosad
*Attorneys*—Griswold and Burdick and Charles W. Carlin ABSTRACT: Long term inhibition of the deposition or accumulation of inorganic scale in operations concerned with working or treating, or producing from, an underground reservoir is attained by employing an organic phosphorus-type scale inhibitor then precipitating its salt within said underground reservoir by a polyvalent inorganic metal salt in an aqueous acidic carrier.

3,633,672

INHIBITION OF DEPOSITION OF SCALE

BACKGROUND OF INVENTION

The deposition of inorganic scale which includes (as used herein) both relatively soft, sometimes greasy and sticky, and relatively hard depositions or accumulations adhering in varying degrees of tenacity to pipes, lines, coils, vessels, housing excavations and other working parts associated with underground operations involving fluid production, transfer, or stimulation, has long plagued the industry concerned with the production of fluids from geologic formations.

Although many scale-removing substances have been found effective and some techniques involving pretreatment of the metal surfaces and/or of the fluid prior to their contacting metal surfaces during which the undesired deposition occurs have been found to be to some extent effective, previous efforts to solve the problem have not been fully satisfactory.

Organic phosphates and organic phosphonates have been tried as inhibitors of scale deposition. Although, in some instances, as above indicated, they have shown promise, a disadvantage usually resulting in their not being accepted has been the fact that, after injection thereof into a geologic formation as in connection with acidizing or hydraulic fracturing operations, the protection afforded by them is only for such a relatively short time that the inconvenience and cost of using them, according to conventional practice, is not fully justified. Modification of the organic phosphonate by admixture with a surface-active chemical improves longevity of inhibitor residence time in formation but drastically reduces penetration of the inhibitor formulation into the underground reservoir.

SUMMARY OF INVENTION

Scale deposition or tenaciously adhering accumulations on equipment are inhibited in underground operations by utilizing the novel approach of the invention which comprises, broadly admixing, at a pH below about 2.2, a salt of a polyvalent metal, e.g., one that yields a di- or trivalent metal ion, and using in combination therewith a phosphorus-containing compounds, i.e., a phosphate or phosphonate-type inhibitor, e.g., nitrilotrimethylene phosphonic acid, as by admixing both ingredients in aqueous acid, the scale inhibitor is caused to precipitate or gel relatively harmlessly within the geologic formation being treated, whenever the pH of the acidic solution exceeds about 2.2, and does not lodge in or on the surfaces of equipment.

Precipitation of the inhibitor formulation within the underground reservoir is achieved as the acidic aqueous carrier fluid reacts with basic constituents within the formation whereby the pH of the carrier fluid increases above about 2.2, at which time the inhibitor formulation is deposited as a slowly soluble precipitate or gel at the desired sites within the formation as a complex organophosphorus-metallic salt with limited solubility in produced connate water.

Salts to use to provide the metal ion include soluble nitrates, halides, sulfates, and acetates of $Fe^{++}$, $Fe^{+++}$, $Ni^{++}$, $Cr^{+++}$, $Mg^{++}$, $Ba^{++}$, $Sr^{++}$, and $Al^{+++}$. Any polyvalent salt may be used so long as it is sufficiently soluble. For example, $BaSO_4$ is not acceptable because of its insolubility. A trivalent Fe salt, e.g., $FeCl_3$ or a hydrate thereof, is most commonly used in the practice of the invention.

One mode of carrying out the invention is to produce the polyvalent metal ion, usually a di- or trivalent metal ion, in situ. For example, if iron or other acceptable metal is known to be present in the geologic formation, as ascertained by a quick analysis of a sample prior to treatment, such condition meets with need for providing the metal ion required for practicing the invention. If the phosphonate delivery fluid has a pH below 2, then oxides of the iron or other acceptable metal will be dissolved by the acid resulting in the metal ion being available to form the polyvalent metal salt of the organic phosphate or phosphonate, which thereafter remains dissolved in the solution until the pH is increased to above about 2.2 within the formation at which time the inhibitor is deposited at the desired sites.

The organophosphate or organophosphonate inhibitor to employ in the practice of the invention includes alkyl ethoxylated phosphates; ethylene diamine tetramethyl phosphonic acid; hexamethylene diamine tetramethylene phosphonic acid; alkyl (ethoxylated) diamines; and alkyl phosphates. Preferred organophosphorus compounds are described in U.S. Pat. Nos. 3,467,192 and 3,336,221 and the references cited therein.

The range of the metal salt to employ should be at least about 1 percent by weight of the organophosphate or organophosphonate present in the aqueous-treating liquid. There is no purpose in exceeding about 5 percent and no occasion justifies adding salt much in excess of about 10 percent. However, greater amounts will not interfere with the accomplishment of the objectives of the invention. The organophosphate or organophosphonate is used in an amount sufficient to make 0.5 to 5.0 percent by weight of the solution, usually about a 1 percent to 2 percent solution is used.

Based on the weight of the treating liquid, it is recommended that between 0.04 and 0.40 pound of the divalent or trivalent metal salt be employed per gallon of the aqueous liquid. Exact metal ion requirement is stoichiometrically equivalent. Greater amounts of the inhibitor than 5 percent (and sometimes greater than 2 to 3 percent) tend to cause the gelation to occur to too great an extent when the pH exceeds about 2.2. Less than about about 0.4 pound of the salt per gallon results in too little gelation occurring.

In the practice of the invention it is recommended that the well be shut in for at least about 3 hours to allow the desired gelation to occur. Gelation will occur only after acid reaction causes rise in pH above about 2.2. The invention is best carried out in association with another operation, e.g., fracturing, acidizing or the like. When so used, the inhibition of the scale deposition is accompanied incidental to the other operation and thereby accompanies to the other desired effect more efficiently and with substantially little additional cost.

The ingredients employed to accomplish the objectives of the invention may be admixed in any known manner, portable rotating mixers being especially convenient to use. The composition must be pumped or otherwise pressured from suitable vessels or tanks down a borehole and forced back into the formation, commonly employing pumps known to provide suitable force to accomplish this purpose. A premixed composition is most convenient. Of course, if preferred, the separate materials may be fed into a common line leading to or down a wellbore whereby intimate mixing is obtained during injection.

So long as the components required to be present in the composition of the method of the invention are brought into contact with the recesses of the formation substantially concurrently (even though one may be injected a short time before the other) a synergistic effect will be attained so long as they are present at the same time to inhibit depositions of substances on pipes, lines, pumps, valves, etc. from the fluid in the formation.

EXAMPLE

The following example illustrates the practice of the invention. Nitrilotrimethylene phosphonic acid was used as the inorganic scale inhibitor. It was a liquid having a flash point of 180° F., a freezing point of −40° F., and a cloud point of −20° F. Sufficient of the scale inhibitor was used to result in a 1 percent by weight aqueous solution which had a pH value below 2.2. Thereafter $FeCl_3 \cdot 6H_2O$ which was in the form of yellow solid crystalline lumps, in an amount to result in 5 percent by weight of the solution, was admixed with the aqueous solution of organic scale inhibitor.

The solution so made was pumped down a well penetrating a geologic formation, which had been giving rise to accumulations of scale on production equipment. The solution was forced back into the formation at fracturing pressures (i.e., at sufficient pressure to overcome the overburden weights and create definite fractures in the formation) and thereafter pressure maintained on the well for a period of about 3 hours after which the pressure was released and the well put back into production. During the subsequent production, tests were taken of the oil being produced and the pipes tested for scale deposition periodically for a period of 12 months. Such tests showed that the combination of $FeCl_3$ and the nitrilotrimethylene phosphonic acid lessened the deposition of scale on the tubing to such a desirable extent as to show a lesser amount thereof in that long period than had theretofore formed in about 3 months.

The protection afforded by the combined inhibiting effect of the $FeCl_3$ and the nitrilotrimethylene phosphonic acid provided a highly desirable savings in the operation of the well by prolonging its period of continuous production three- to four-fold over that previously experienced.

There is thus shown an unpredictable synergistic effect against scale deposition from underground fluids on pipes, tubing, pumps, vessels, valves, and other working parts, by emplacing a polyvalent metal salt soluble in the treating fluid and an organophosphate or phosphonate scale inhibitor in the formation whereby the deposition of interfering scale on the surface of well-working, treating, or production equipment is inhibited.

Having described our invention, what we claim and desire to protect by Letters Patent is:

1. The method of inhibiting the formation of scale, of either a soft or hard nature or mixture thereof, on well-working, treating, or production equipment, with which a fluid present in a geologic formation comes in contact, which comprises contacting inner recesses of the formation with an acidic aqueous composition having a pH value not greater than 2 consisting essentially by weight of at least about 1 percent of at least one polyvalent metal salt soluble in said aqueous composition and between about 0.5 and about 5.0 percent of an organic phosphorus-containing compound selected from the class consisting of organophosphates and organophosphonates and balance substantially water and maintaining the well closed in until said acidic composition reaches a pH greater than about 2.2.

2. The method according to claim 1 wherein the salt of said composition consists essentially of between about 1 and about 5 percent of a salt selected from the class consisting of at least one of a halide, nitrate, sulfate, phosphate, and acetate of at least one metal selected from the class consisting of $Fe^{++}$, $Fe^{+++}$, $Ni^{++}$, $Ni^{+++}$, $Cr^{+++}$, $Cr^{+6}$, $Mg^{++}$, Ba and $Al^{+++}$.

4. The method according to claim 1 wherein the aqueous composition containing said salt and organic phosphorus-containing compound is injected down the well and forced back into the formation sufficiently to become at least temporarily lodged in the outer recesses of a fluid-bearing zone thereof when the pH of the aqueous solution exceeds about 2.

3. The method according to claim 2 wherein said salt is a ferric salt of a mineral acid.

5. The method according to claim 3 wherein the formation being treated contains available iron ions and an iron salt is obtained by contacting iron-containing components of the formation with a low pH aqueous liquid containing the organic phosphorus-containing compound.

6. The method according to claim 1 wherein the organic phosphorus-containing compound employed is nitrilotrimethylene phosphonic acid in an amount of between about 0.5 and 5.0 percent by weight of said aqueous composition.

7. The method according to claim 1 wherein the well is closed in for at least about 3 hours.

\* \* \* \* \*